United States Patent [19]

Barlow et al.

[11] 4,208,222
[45] Jun. 17, 1980

[54] IN SITU INTERLAYER FORMATION FOR TRANSIENT LIQUID PHASE DIFFUSION BONDING

[75] Inventors: Melvin C. Barlow, East Hampton; Joseph F. Loersch, Bolton; both of Conn.; Malcolm Basche, deceased, late of West Hartford, Conn., by Joyce O. Basche, heir

[73] Assignee: United Technologies Corporation, Hartford, Conn.

[21] Appl. No.: 810,463

[22] Filed: Jun. 27, 1977

[51] Int. Cl.$^2$ .............................................. B23K 19/00
[52] U.S. Cl. ......................................... 148/6; 148/6.3; 228/194; 228/208; 228/263R; 428/661; 428/667
[58] Field of Search ................... 148/6; 428/941, 661, 428/667; 228/193, 194, 195, 208, 209, 211, 263; 219/92

[56] References Cited

U.S. PATENT DOCUMENTS

| | | |
|---|---|---|
| 3,339,269 | 9/1967 | Hanink .................................. 228/219 |
| 3,530,568 | 9/1970 | Owczarski et al. ................... 228/194 |
| 3,678,570 | 7/1972 | Paulonis et al. ....................... 228/194 |
| 3,753,794 | 8/1973 | Paulonis et al. ........................... 148/6 |
| 4,005,988 | 2/1977 | Paulonis et al. ..................... 428/941 |
| 4,059,217 | 11/1977 | Woodward ........................... 228/194 |
| 4,122,992 | 10/1978 | Duvall et al. ......................... 228/194 |

Primary Examiner—Ralph S. Kendall
Attorney, Agent, or Firm—Edward J. Timmer; Charles G. Nessler

[57] ABSTRACT

An interlayer for transient liquid phase diffusion bonding is provided by depositing a metallic coating on at least one of the superalloy surfaces to be bonded and boriding a portion of the metallic coating to form a working coating having an overall composition resembling that of an interlayer alloy and an overall melting temperature less than that of the superalloys. When the superalloy surfaces are placed in contact and heated to above said melting temperature, the partially borided metallic coating functions as an interlayer alloy to effect bonding.

9 Claims, No Drawings

IN SITU INTERLAYER FORMATION FOR TRANSIENT LIQUID PHASE DIFFUSION BONDING

BACKGROUND OF THE INVENTION

1. Field of the Invention

The present invention relates in general to the art of diffusion bonding and, more particularly, to diffusion bonding of the superalloys utilizing a transient liquid phase in the bonding process.

2. Description of the Prior Art

Transient liquid phase diffusion bonding has been shown to be a very useful method for producing high quality diffusion bonds in the high temperature superalloys, such as those used in the manufacture of gas turbine engine hardware. Such bonding is described in detail in the U.S. Pat. No. 3,678,570 to D. F. Paulonis et al, of common assignee herewith, and whose teachings are incorporated herein by reference.

The superalloys are recognized as those alloys usually having basis in nickel, cobalt or iron, or some combination thereof and exhibiting good high temperature strength and oxidation resistance in environments such as gas turbine engines. Usually, these alloys also contain substantial quantities of chromium and also a limited amount of other elements such as aluminum, titanium and the refractory metals.

It is frequently desirable to make certain gas turbine engine components by joining easily fabricable segments together into the desired configurations. However, the limited weldability of many of the superalloys has severely limited the applicability of fusion welding techniques in the production of structural hardware. Further, many components, because of their design, are simply not adapted to the utilization of fusion welding. Brazing, while offering a number of advantages over fusion welding, has very limited application because of the penalties such as relatively low strengths and low melting points associated with the typical brazed joints.

The relative simplicity and reproducibility of the transient liquid phase diffusion bonding technique in the production of high quality bonds in sensitive hardware has led to substantial usage thereof. This is particularly true in the gas turbine engine industry, although the invention described herein is obviously not limited thereto.

One key element in the transient liquid phase diffusion bonding technique is the provision, between the surfaces to be joined, of a thin alloy interlayer. The composition of the interlayer preferably and generally should be tailored to the alloys being joined, particularly with respect to the inclusion therein of those elements whose presence is required in the finished bond area and whose solid state diffusion rates are low. It is also desirable to exclude from the interlayer alloy those elements which may adversely affect the bonding process or the quality of the finished joint. In all of the interlayer compositions a high boron content is utilized.

Methods for providing the interlayer alloy between the faying surfaces are described in the Paulonis et al patents, U.S. Pat. Nos. 3,753,794 and 4,005,988, both of which share a common assignee herewith. In one case, the interlayer alloy is in the form of a thin, ductile foil while in the other it is in the form of a coating deposited on one or more of the faying surfaces, the coating containing as its basis metal the base metal of the superalloys and a quantity of boron as a melting point depressant. Although these techniques have proved highly successful, the search for still less expensive and time consuming methods for providing the interlayer alloy has continued.

SUMMARY OF THE INVENTION

According to the method of the present invention, the interlayer alloy for transient liquid phase bonding is provided by depositing a metallic coating on one or more of the surfaces to be bonded and boriding a portion of the coating to form a working coating having an overall composition resembling that of an interlayer alloy and having an overall melting temperature less than that of the superalloys being bonded. When the superalloys are heated to above said melting temperature with the surfaces in contact, the partially borided metallic coating functions as an interlayer alloy to effect bonding.

In a preferred embodiment for bonding superalloys, the invention envisions depositing the metallic coating on one or more of the surfaces in the form of a layer of chromium and a layer of the superalloy base metal thereover and boriding one of the layers of the coating on at least one of the surfaces to provide the interlayer of desired melting temperature. Bonding is then effected in the usual manner.

The present invention is especially useful in bonding superalloy parts having highly complex mating surfaces, for example, those associated with gas turbine blades, vanes and the like, wherein placement of the interlayer foil between and in registry with the mating surfaces is difficult due to their complex configuration. With the aid of the present invention, the desired interlayer alloy can be readily, accurately and inexpensively formed in situ on one or more of the surfaces regardless of their complexity.

The foregoing and other objects, features and advantages of the present invention will become more apparent in the light of the following detailed description of preferred embodiments thereof.

DESCRIPTION OF THE PREFERRED EMBODIMENTS

Although the exemplary embodiments described in detail hereinbelow relate to the bonding of nickel-base superalloys, they are offered merely for illustration and are not intended to limit the scope of the present invention.

In initial bonding trails, nickel base superalloy substrates of nominal composition, by weight, 9% Cr, 10% Co, 2% Ti, 5% Al, 12.5% W, 2% Hf, 1% Cb, balance essentially nickel (hereafter referred to as MAR-M 200+Hf) were joined. The interlayer required for transient liquid phase bonding was provided on the substrate surfaces by electroplating a nickel coating thereon to a thickness of about 1.5 to 2.0 mils and then partially boriding the electroplated coatings, such as to a thickness of 0.2–0.5 mil, to provide about 2–4.5 weight percent boron in the overall coating (boron being present as nickel borides and the like). Boriding was effected by exposing the electroplated nickel coatings to boron trichloride and hydrogen gas as taught in U.S. Pat. No. 3,859,144, boriding being allowed to progress through only a portion of the coating so that an unborided inner portion is in atomic contact with the borided outer portion. As discussed in the patent, this structure is necessary in order to provide an interlayer having an overall melting temperature less than that of the superalloy being bonded. Thereafter, the borided substrate surfaces were held in contact under slight pressure, such as 2–3 psi, and the assembly heated initially in a vacuum for two hours at 2145° F. to effect bonding and then in 100 microns of argon for 22 hours at a similar temperature in an attempt to homogenize the chemistry at the joint. This heat treatment resulted in full isothermal solidification of the joint between the substrates.

Although satisfactory diffusion bonds can be made with the simple nickel-boron binary interlayer alloys, such as demonstrated above, generally more complex interlayer alloys are preferred when bonding the chemically complex nickel base superalloys, such as MAR-M 200+Hf. To this end, the presence of chromium in the interlayer is advantageous for several reasons. First, chromium itself tends to further depress the melting temperature of the interlayer alloy, allowing the bonding process to proceed at a lower temperature, up to 50°–150° F. in some cases. Second, a great number of superalloys of interest, including MAR-M 200+Hf, contain chromium as an alloying addition for oxidation and corrosion resistance. By furnishing chromium to the bond region by means of the interlayer material, reliance on its migration thereto by solid-state diffusion from the substrates is not necessary. This reduces bond cycle time and increases the chemical homogeneity of the joint.

Consequently, in another embodiment of the invention, the metallic coating is deposited on one or more of the surfaces to be bonded as a plurality of individual metallic layers to provide the more complex chemistry desired. For example, in bonding MAR-M 200+Hf substrates, the substrate surfaces were electroplated with a first layer of chromium and second layer of nickel thereover, the relative thicknesses of the electroplated layers being selected to provide a nickel base coating having a chromium content corresponding essentially to that in the substrate alloy (9% Cr), typical thickness being 2.0 mils of chromium electroplate and 4.0 mils of nickel electroplate. Thereafter, the nickel layer on each substrate was partially borided as described above to provide about 4.0 weight percent boron in the overall coating composition and the surfaces were bonded together in the usual manner by heating under contact to above the melting temperature of the metallic coating which coating functioned as an interlayer alloy to effect bonding.

Of course, the sequence of steps in this embodiment, that is, deposition and boriding, may be varied as desired. For example, in some situations, it may be desirable to deposit the nickel layer first, boride the nickel layer and then deposit the chromium layer. Or, the nickel layer can initially be deposited followed by deposition and boriding of the chromium layer. Also, although not preferred, boriding may be conducted such that portions of each layer are borided. In most cases, the exact interlayer alloy composition will be a matter of choice depending upon the particular application. The overall boron content is generally selected primarily as a function of its melting temperature depressing effect. And, in general, boron will be added to the metallic coating composition in amounts necessary to sufficiently depress the melting temperature, amounts of 4.5 weight percent or less usually being provided.

The total thickness of the nickel and/or chromium layers will be dependent upon the particular application, such as the fit or roughness of the surfaces, but it will usually be preferable to keep the total thickness to a reasonable minimum particularly where complete homogenization across the joint interface is desired in a reasonable cycle time. The method for depositing the metallic coating likewise depends upon particular needs; however, electroplating is the preferred technique since it is easily controlled and relatively inexpensive. Electroplating is especially advantageous since well known masking techniques can be employed to insure that only those surfaces to be bonded are plated. Any of the well known boriding techniques can be used so long as they are compatible with the superalloys being bonded, that is, so long as they do not contaminate or introduce deleterious substances into the superalloys or on their surfaces. Boriding can be effected by forming a colloidal suspension of boron in a vaporizable dispersant, painting the metallic coating therewith and drying and thereafter heat treating to promote boron diffusion. Other satisfactory techniques include boriding from boride salts in a molten salt bath and pack cementation using boron powder.

Using the technique disclosed herein it is also possible where desired to provide an additional layer or layers of other elements, such as tungsten, molybdenum, aluminum, hafnium, to form two, three or more separate layers on the surfaces. The principal caution is to avoid those elements which will interfere with either the bonding process or result in an unsatisfactory joint by, for example, the formation of deleterious brittle compounds.

Of course, other changes, omissions and additions in the form and detail of the preferred embodiments may be made without departing from the spirit and scope of the invention.

Having thus described a typical embodiment of our invention, that which we claim as new and desire to secure by Letters Patent of the United States is:

1. A method for bonding superalloy workpiece surfaces comprising:
  (a) depositing a metallic coating on at least one of the surfaces to be bonded, the overall coating composition having as its basis metal the same base metal as the superalloys;
  (b) boriding a portion of the metallic coating so that a working coating having an overall composition resembling that of an interlayer alloy and an overall melting temperature less than that of the superalloys is formed; and
  (c) establishing contact between said surfaces and heating to above said melting temperature, the partially borided metallic coating functioning as an interlayer alloy to effect bonding.

2. The method of claim 1 wherein the metallic coating is deposited as a first layer and a second layer thereover, one layer having as its basis metal the base metal of the superalloys and the other layer having as its basis metal another element of the superalloys.

3. The method of claim 2 wherein the layer having as its basis metal the base metal of the superalloys is borided.

4. The method of claim 2 wherein one of the layers is chromium and the other is selected from the group consisting of nickel, cobalt and iron.

5. A method for bonding surfaces of nickel base superalloys, comprising:
  (a) depositing a metallic coating on at least one of the surfaces to be bonded, including depositing at least one layer of chromium and at least one layer of nickel one upon the other, the relative thicknesses of the layers being such that the overall coating composition is based on nickel;

(b) boriding a portion of one of the layers of the coating on at least one of the surfaces so that a working coating with an overall melting temperature less than that of the nickel base superalloys is formed; and (c) establishing contact between said surfaces and heating to above said melting temperature, the partially borided nickel base coating functioning as a nickel base interlayer alloy to effect bonding.

6. The method of claim 5 wherein the thickness of the chromium layer relative to that of the nickel layer provides an overall chromium content in the coating similar to that in the superalloys.

7. The method of claim 5 wherein the chromium layer is deposited first, the nickel layer is deposited second and the nickel layer is then borided.

8. The method of claim 7 wherein boriding provides an overall boron content in the coating from about 2–4.5 weight percent.

9. The method of claim 5 wherein coatings are applied to both of the surfaces to be bonded and both coatings are borided.

* * * * *